May 21, 1946.　　　M. O. SEARLE　　　2,400,606
ELECTRIC CONDUIT AND METHOD OF MAKING SAME
Filed Aug. 18, 1943　　　2 Sheets-Sheet 1

Inventor

Marshall O. Searle

By　Clarence A. O'Brien
and Harvey B. Jacobson
Attorneys

May 21, 1946.  M. O. SEARLE  2,400,606
ELECTRIC CONDUIT AND METHOD OF MAKING SAME
Filed Aug. 18, 1943  2 Sheets-Sheet 2
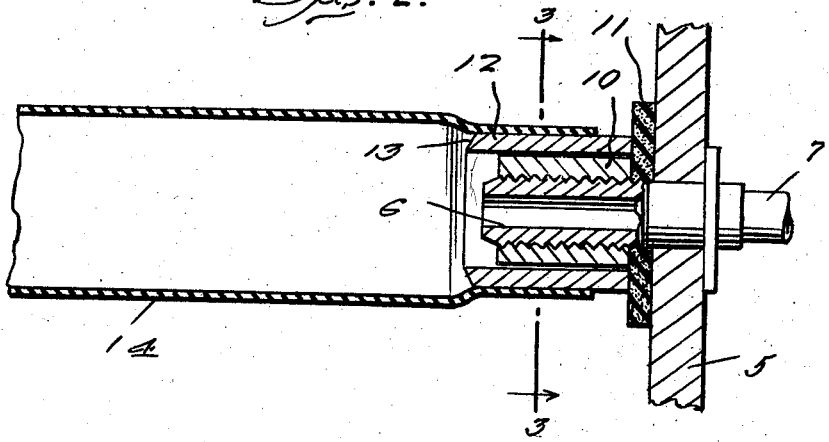
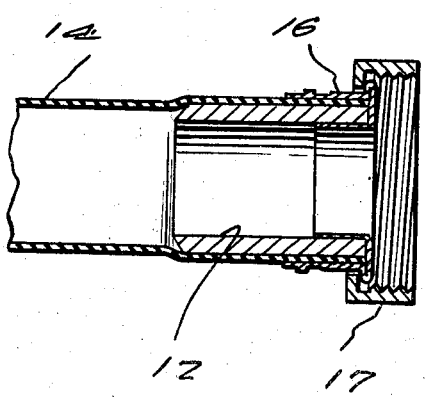
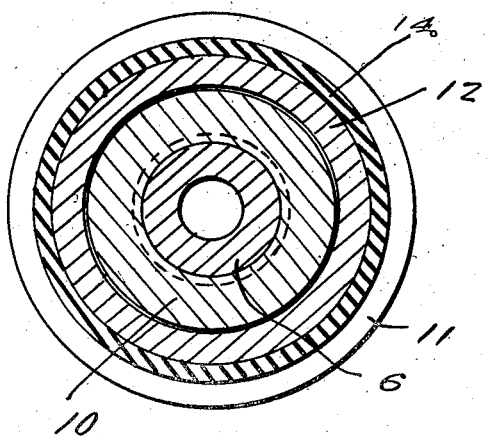
Inventor
Marshall O. Searle
By Clarence A. O'Brien
and Harvey B. Jacobson
Attorneys Patented May 21, 1946

2,400,606

UNITED STATES PATENT OFFICE 2,400,606

ELECTRIC CONDUIT AND METHOD OF MAKING SAME

Marshall O. Searle, Beverly Hills, Calif.

Application August 18, 1943, Serial No. 499,146

1 Claim. (Cl. 29—235)

The present invention relates to new and useful improvements in conduits for electric wires in airplanes and for other purposes to protect the wire from heat, chafing, moisture and other elements which may cause injury or affect the proper functioning of the electric system.

An important object of the invention is to provide a novel method of constructing the conduit and for assembling a metal coupling on the ends of a flexible plastic tubing.

A further object is to provide an article of this character of simple and practical construction, which is economical to manufacture, strong and durable, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which—

Figure 2 is a sectional view of the air nozzle with the conduit attached thereto.

Figure 3 is a sectional view taken on a line 3—3 of Figure 2.

Figure 4 is a longitudinal sectional view of one end of the conduit, and

Figure 1:
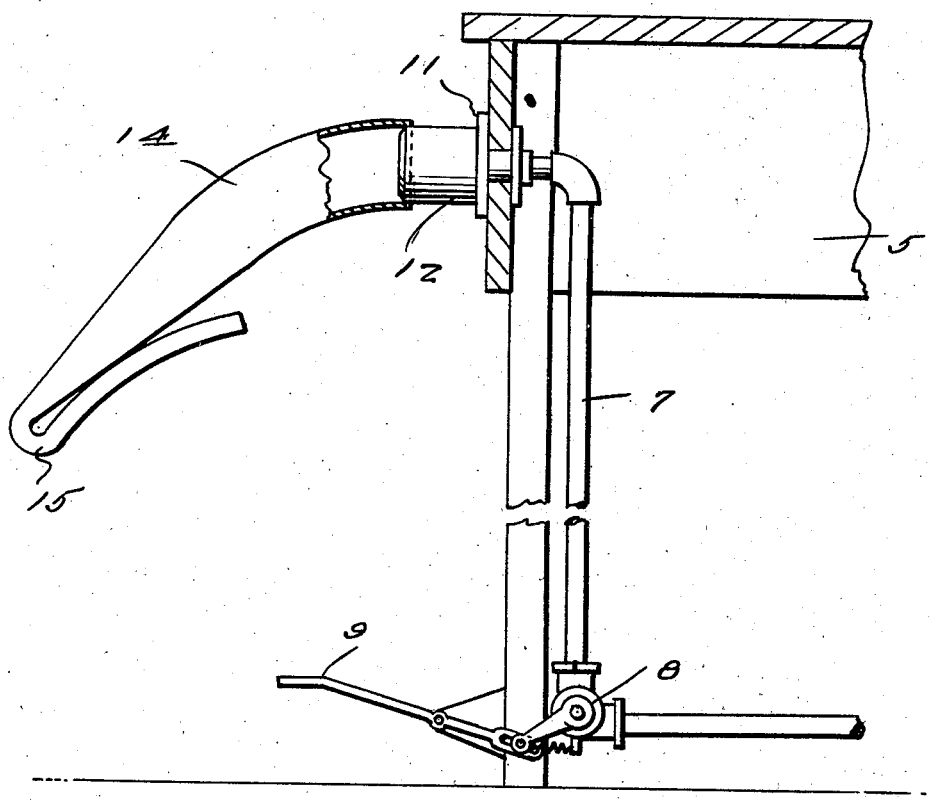
Figure 1 is a fragmentary side elevational view of the work bench or table with parts shown in section.
Figure 5:
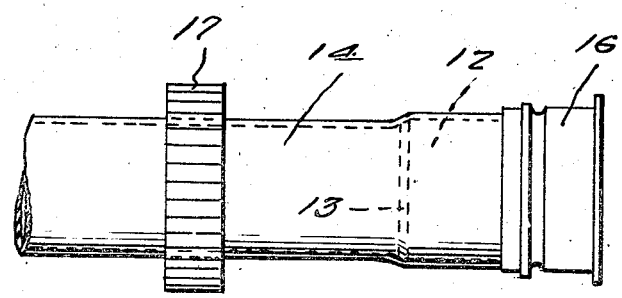
Figure 5 is a side elevational view thereof.

Referring now to the drawings in detail, the numeral 5 designates a work bench or table in one side of which is fitted an air nozzle 6 attached to a compressed air line 7 leading to a suitable source of supply for feeding compressed air to the nozzle. A valve 8 is arranged in the air line controlled by a foot pedal 9.

The end of the nozzle projects from the side of the table and threaded or otherwise suitably mounted thereon is a cylindrical adapter 10 abutting a soft rubber or other washer 11 on the nozzle. The adapter may be of various diameters to snugly receive a fibre sleeve 12 removably mounted on the adapter, the outer end of the sleeve being beveled as shown at 13.

A flexible expansible plastic tubing 14, which may be of any suitable composition or material and which may be transparent or translucent, has one end partially inserted on the sleeve, the tubing being of a diameter to tightly fit on the sleeve, and in order to facilitate the complete insertion of the tubing on the sleeve, the tubing is pinched or folded by the operator as shown at 15 to close the free end thereof and air under sufficient pressure is then admitted to the tubing to expand the same and enable the tubing to freely slide onto the sleeve to the full length of the sleeve and thus position the sleeve within the end of the tubing to reinforce the latter. When the pressure of air is released the tubing will contract on the sleeve and provide a tight fit therefor.

A metal ferrule 16 is then swaged onto the tubing and sleeve to act as a stop for a nut 17 freely mounted on the tubing for coupling sections of the tubing together, or for attaching to suitable fixture to anchor and enclose an electric wire extending through the tubing.

Both ends of the tubing are similarly equipped with the reinforcing fibre sleeves and couplings.

It is believed the details of construction, operation and manner of use of the device will be readily understood from the foregoing without further detailed explanation.

Having described the invention, what is claimed as new is:

An apparatus for inserting a fibre sleeve in the end of an expansible plastic tubing and comprising an air nozzle leading to a source of supply, a rigid support through which the nozzle is inserted, an adapter threaded on the nozzle and adapted to abut one side of the support to tighten the nozzle therein, said adapter being adapted to frictionally receive the sleeve to support the latter for initially receiving one end of the tubing, the other end of the tubing being closed, said tubing being responsive to compressed air admitted thereto to expand the tubing to facilitate feeding of the tubing onto the sleeve, and means for controlling feeding of air to the nozzle.

MARSHALL O. SEARLE.